Sept. 21, 1965    E. L. ERFERT    3,207,011
MACHINING APPARATUS
Filed Dec. 31, 1962    2 Sheets-Sheet 1

INVENTOR.
ERWIN L. ERFERT
BY
Wallace, Kinzer & Horn
ATT'YS.

Sept. 21, 1965 E. L. ERFERT 3,207,011
MACHINING APPARATUS
Filed Dec. 31, 1962 2 Sheets-Sheet 2
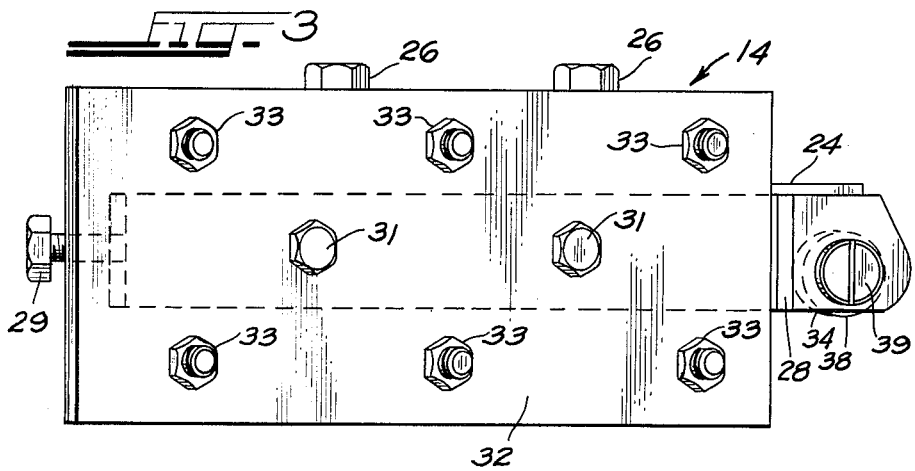
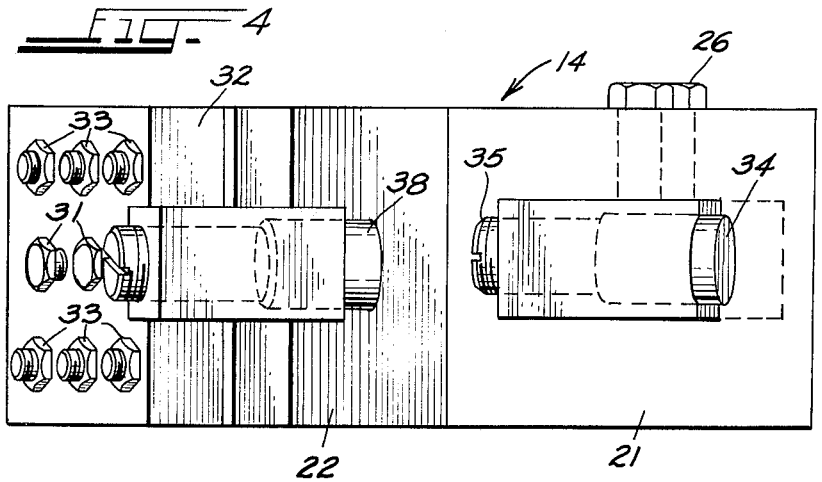
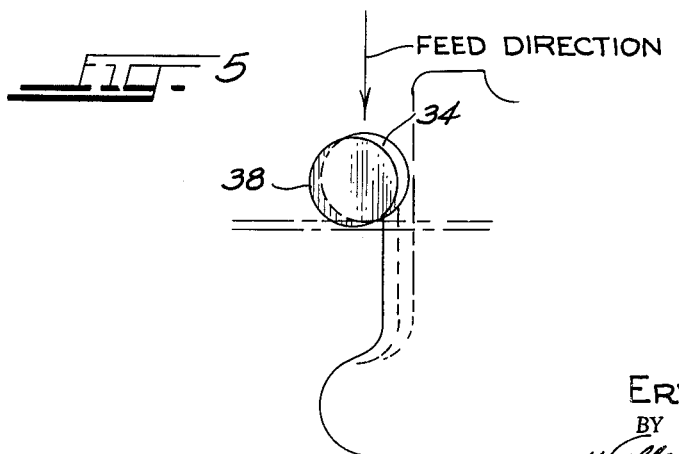
INVENTOR.
ERWIN L. ERFERT
BY
Wallace, Kinzer & Horn
ATT'YS United States Patent Office 3,207,011
Patented Sept. 21, 1965

3,207,011
MACHINING APPARATUS
Erwin L. Erfert, Allendale, N.J., assignor to American Brake Shoe Company, New York, N.Y., a corporation of Delaware
Filed Dec. 31, 1962, Ser. No. 248,320
2 Claims. (Cl. 82—8)

This invention relates to a new and improved apparatus for machining relatively large castings, forgings, or the like, and more specifically to a new and improved lathe apparatus for machining the tread surfaces of steel wheels for railroad service.

The machining of tread surfaces on steel wheels used for railroad service presents substantial problems with respect to high tool cost, poor dimensional control, and time required for the machining operations. In conventional lathe operations, parallel juxtaposed cutting tools are frequently used in removing metal from castings, forgings, or the like. The conventional machining arrangements, however, cannot be used effectively by railroad car wheel manufacturers due to the problem of contouring and the necessity of blending the machined surface of the tread with other machined surfaces including the flange and inner rim of the wheel.

The heavy cuts required and the large diameter of the workpiece, in an unfinished railroad wheel, coupled with a requirement for relatively heavy cutting pressures, materially affect the tool life and the final finish of the work piece produced. Machine time and tool consumption are frequently both excessive, due to early tool failure from erosion, impact, and overheating. Operating costs are high, due to the necessity for frequent tool changes and to the requirement for a dual machine cycle, a first cut being made to remove most of the metal with a finish cut following the initial rough cut. Previous attempts to perform the requisite machining in a single operation have been unsatisfactory, particularly due to vibration of the cutting heads.

It is a principal object of the invention, therefore, to afford a new and improved method and apparatus for machining railroad wheel treads that will permit two cutting tools to operate simultaneously on the tread and thereby obtain the benefits of simultaneous rough and finish cutting operations.

A specific object of the invention is to minimize or eliminate tool chatter in a combination rough and finish cut operation on the tread of a railroad wheel, or in a comparable machining operation on large workpieces.

A specific object of the invention is to utilize the forces to which the tools are subjected, in the course of a combination rough and finish cutting operation, to increase the effective rigidity of the tooling.

Other and further objects of the present invention will be apparent from the following description and claims and are illustrated in the accompanying drawings which, by way of illustration, show a preferred embodiment of the present invention and the principles thereof and what is now considered to be the best mode contemplated for applying these principles. Other embodiments of the invention embodying the same or equivalent principles may be made as desired by those skilled in the art without departing from the present invention and the purview of the appended claims.

In the drawings:

FIG. 3 is a front elevation view of the tool holder assembly of FIG. 2;

FIG. 4 is a side elevation view of the tool holder assembly; and

FIG. 5 is a schematic diagram illustrating the positions of the rough cut and finish cut tools relative to the workpiece.

Figure 1:
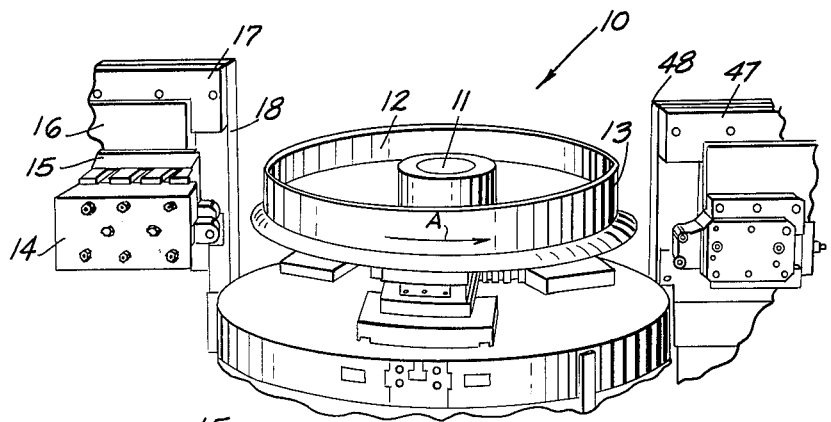
FIG. 1 is a perspective view of a lathe for machining steel wheel treads for railroad service, including a tandem cutting head tool holder assembly constructed in accordance with the present invention.

FIG. 1 illustrates a lathe generally designated by reference numeral 10 and including a vertically oriented spindle 11 upon which a steel railroad wheel 12 is mounted for machining of the wheel tread 13. The construction of the portion of the lathe 10 utilized to rotate the workpiece 12, including the spindle 11, is not critical to the present invention, and any conventional lathe construction suitable for heavy duty work may be employed. Lathe 10 further includes a tool assembly 14 that carries both rough cutting and finish cutting tools; the tool assembly is constructed in accordance with the present invention and is described in greated detail hereinafter in connection with FIGS. 2–5.

The support means for tool assembly 14 comprises a bracket or other mounting member 15 that, in turn, is affixed to a slide 16 movable longitudinally of a guide 17 to advance and retract tool assembly 14 from working position. Means are also provided for moving the base member 18 upon which slide 17 and assembly 14 are mounted, in a vertical direction in the course of a machining operation. Inasmuch as the means adopted for advancing and retracting tool assembly 14 and for effecting a vertical feeding movement of the tool holder during a machining operation are not critical to the present invention, such means have not been shown in the drawings. Again, it is sufficient that the means adopted for this purpose be suitable for a heavy duty machining operation.

Figure 2:
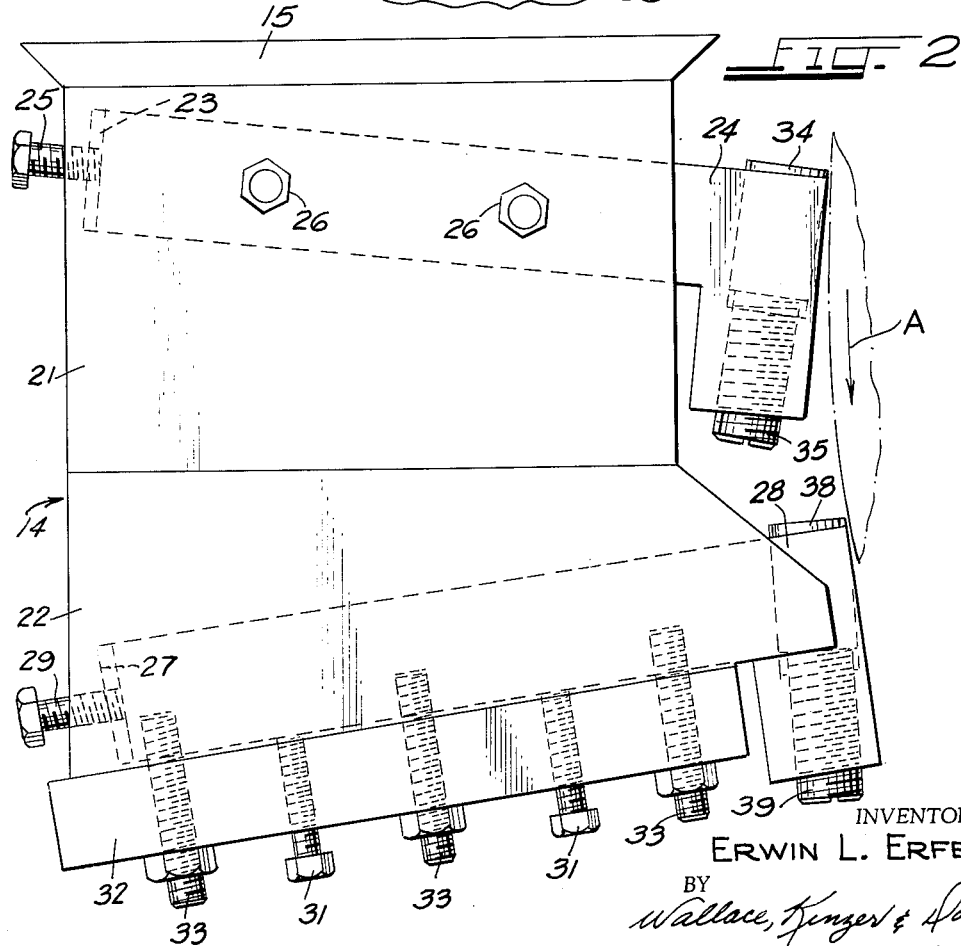
FIG. 2 is a plan view, drawn to a substantially larger scale, of the tool holder assembly of the lathe of FIG. 1.

As shown in FIGS. 2–4, tool assembly 14 comprises an inner tool block 21 that is secured to the bracket or support member 15, and an outer tool block 22 rigidly affixed to and constituting an extension of tool block 21. Tool block 21 is provided with an internal bore or aperture 23 for receiving a first tool holder 24. An adjustable stop member 25 determines the depth to which tool holder 24 is inserted in aperture 23. The tool holder is clamped rigidly in position within block 21 by suitable means such as the retaining screws 26.

Similarly, the outside tool block 22 is provided with an elongated aperture or slot 27 that affords a receptacle for a second tool holder 28. In this instance, the side of the slot is closed by a plate 32 secured to block 22 by a series of bolts 33, so that the plate is a part of the block. Again, an adjustable stop member 29 is provided to determine the depth to which the tool holder 28 is inserted within block 22 and suitable retaining screws 31 are provided to lock the tool holder in place within the block.

A first cutting tool 34 is mounted in tool holder 24, an adjustable stop member 35 being provided to determine the length to which the cutting tool 34 projects from the tool holder. A similar cutting tool 38 is mounted in tool holder 28, the position of the tool being determined by an adjustable stop 39. Tool 38 is the rough cut tool and tool 34 is the finish cut tool, the tools being located one behind the other in the direction of movement of the workpiece.

As is best shown in FIGS. 2 and 4, the rough cut tool 38 is located very slightly below finish cut toll 34. Thus, the two tools are aligned approximately in a common plane normal to the axis of the spindle 11, with only a very small displacement between the two in the direction in which the work is fed during machining; in this instance, the displacement is in a vertical direction.

It is also important to note the direction of movement of the work relative to the positioning of tools 34 and 38 and the mounting of tool assembly 14 on the lathe 10.

In the illustrated arrangement, the direction of rotation of the work is counterclockwise, as shown by arrows A in FIGS. 1 and 2. The tool mounting means of assembly 14, blocks 21 and 22, extend away from the support means 15–18 in a direction approximately parallel to the direction of movement of wheel 12 past the support means (arrows A). Hence, the position of tool assembly 14 is such that, during a cutting operation, engagement of the wheel 12 with tools 34 and 38 tends to pull the tools, and the tool assembly, away from the supporting structure comprising members 15–18. That is, the construction is such that the tool blocks of tool holders comprising assembly 14 are maintained in tension relative to the bed of the lathe.

Operation of the lathe 10 is carried out in substantially the same manner as with a conventional single-tool lathe structure. Thus, to machine wheel 12, the wheel is rotated upon spindle 11 and tool assembly 14 is advanced to bring tools 34 and 38 into engagement with rim 13 of the wheel. As can be seen from FIG. 2, the rim of the wheel is first cut by roughing tool 38, and the cut made by tool 38 is followed by a smaller finish cut effected by tool 34. To complete the cut, relative movement is effected, in a vertical direction, between assembly 14 and wheel 12 to traverse the axial length of rim 13 with both cutting tools. As shown in FIG. 5, the direction of feed, taken as the direction in which tools 34 and 38 move relative to the work piece, is downwardly, so that the rough cut precedes the finish cut in all instances. Of course, it is possible to move either the spindle or the tool assembly, depending upon the basic lathe construction.

It is essential to the present invention that the tool holder assembly 14 be arranged to maintain the tools in a substantially constant condition of stress, relative to their support members, during the machining operation. Thus, if toolholder assembly 14 were mounted on the slide 47 at the opposite side of lathe 10, effectively placing the tool assembly in compression toward the supporting bed structure 48 of the lathe, an acceptable finish may still be achieved. Whether the tool assembly is placed in tension or compression, the cutting forces occurring during machining are utilized, in the present invention, to increase the effective rigidity of the tooling. Comparable results are not achieved with separate mountings for the two cutting tools, due to tool chatter and the resultant "coining" effect on the finish cut.

In the drawings, conventional re-usable cutters are shown as the cutting elements 34 and 38. These inserts, which may be re-ground, are illustrated as being of cylindrical configuration, but other tool shapes may be utilized with good results. Furthermore, the commonly known throw-away type of tool insert may be employed if desired.

Hence, while preferred embodiments of the invention have been described and illustrated, it is to be understood that they are capable of variation and modification, and I therefore do not wish to be limited to the precise details set forth, but desire to avail myself of such changes and alterations as fall within the purview of the following claims.

I claim:

1. In a lathe for machining the surface of a cast steel railroad wheel or the like requiring removal of a substantial amount of metal, and including (1) a slide and (2) a spindle rotating in a given direction about a predetermined axis spaced from the slide, (3) tool support means carried by and movable with said slide toward and away from said spindle, and (4) feed means for moving the tool support to traverse the spindle parallel to the axis of the spindle during a machining operation, a tool assembly comprising first and second independent tool holders, a finish cut tool and a rough cut tool mounted in said first and second tool holders, respectively, and tool block means mounting said tool holders on said tool support means and including slots independent of one another in which the tool holders are mounted approximately in a plane normal to said axis, with the second tool holder behind the first in the direction of rotation of said workpiece, said finish tool projecting toward said spindle axis slightly more than said rough tool, said rough cut tool being spaced in an axial direction slightly ahead of said finish cut tool to traverse the spindle ahead of the finish cut tool, so that the resulting forces applied to said tools during cutting stress said tool assembly in said direction, minimizing the tendency of the tools to chatter and permitting rapid removal of metal from said workpiece while leaving a finished surface in one cutting operation.

2. The lathe of claim 1 wherein said slots in said tool block means are disposed along radial lines from said spindle axis and wherein said tool holders are movable along said radial lines to adjust the respective positions of said tools to cut different diameters.

References Cited by the Examiner

UNITED STATES PATENTS

| | | | |
|---|---|---|---|
| 1,151,737 | 8/15 | Thomas | 82—1 |
| 2,687,563 | 8/54 | Bader | 29—97 |
| 2,877,536 | 3/59 | Monosmith | 29—97 |
| 2,900,704 | 8/59 | Sweet | 29—97 X |
| 3,041,903 | 7/62 | Rousseau | 82—1 |
| 3,078,547 | 2/63 | Sweet | 29—97 |

FOREIGN PATENTS

| | | |
|---|---|---|
| 16,744 | 8/02 | Great Britain. |
| 19,607 | 10/01 | Great Britain. |

WILLIAM W. DYER, JR., *Primary Examiner.*